Dec. 29, 1964 J. A. ROSS 3,163,782
MULTIPLE DELAY LINE SOLID STATE PULSE MODULATOR
Filed July 25, 1963

INVENTOR:
JAMES A. ROSS
BY Harry R. Lubcke
AGENT 3,163,782
MULTIPLE DELAY LINE SOLID STATE PULSE MODULATOR James A. Ross, Villa Park, Calif., assignor to Ling-Temco-Vought, Inc., Dallas, Tex., a corporation of Delaware Filed July 25, 1963, Ser. No. 297,579
17 Claims. (Cl. 307—88.5)

My invention relates to electrical modulators and particularly to pulse modulators in which the power capability is increased by operating a large number of units together.

This invention brings increased reliability to the high-power pulse modulator field by eliminating the gaseous thyratron or ignitron and substituting therefor a multiplicity of semiconductor devices, such as silicon controlled rectifiers (SCR's). Thyratrons and ignitrons are high voltage devices. Normally only one is used as a shorting switch in a pulse modulator and it is operated at, say, 40 kilovolts. Semiconductor devices are inherently low voltage devices and may be operated at, say, 400 volts. In the gaseous devices the current may be 3,000 amperes. In order to attain the same power with semiconductors a current of 300,000 amperes is required. Such pulse currents are impossible in a single apparatus because of stray inductance. I connect a large multiplicity of low power semiconductor devices in parallel and thus suitably reduce the inductance so that the modulator is operable.

In addition to the very important attribute of increased reliability there is also obtained reduced demand upon the power circuit, longer life, reduced size and weight, and lower cost; which constitute objects of my invention.

Other objects will become apparent upon reading the following detailed specification and upon examining the accompanying drawings, in which are set forth by way of illustration and example certain embodiments of my invention.

Figure 1:
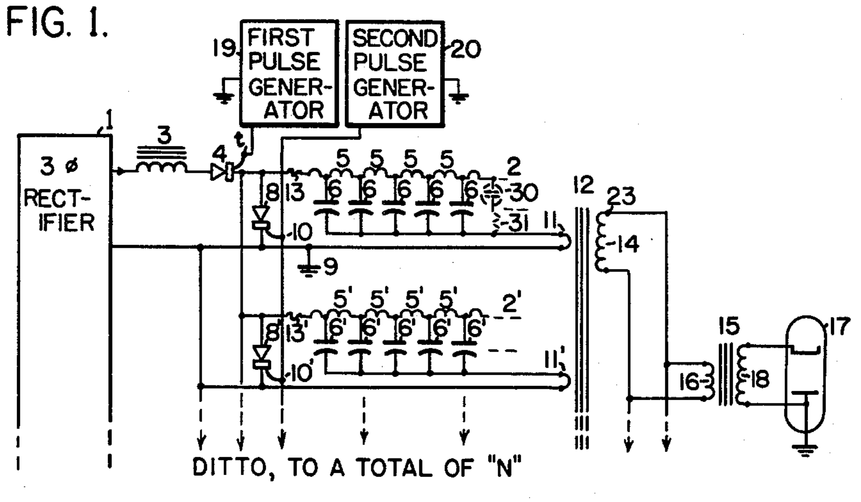
Figure 2:
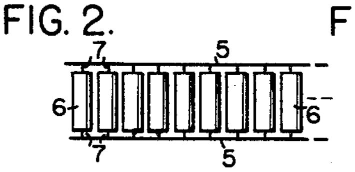
Figure 3:
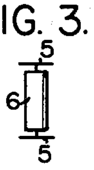
Figure 4:
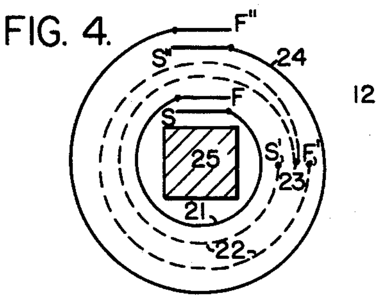
Figures 5, 6:
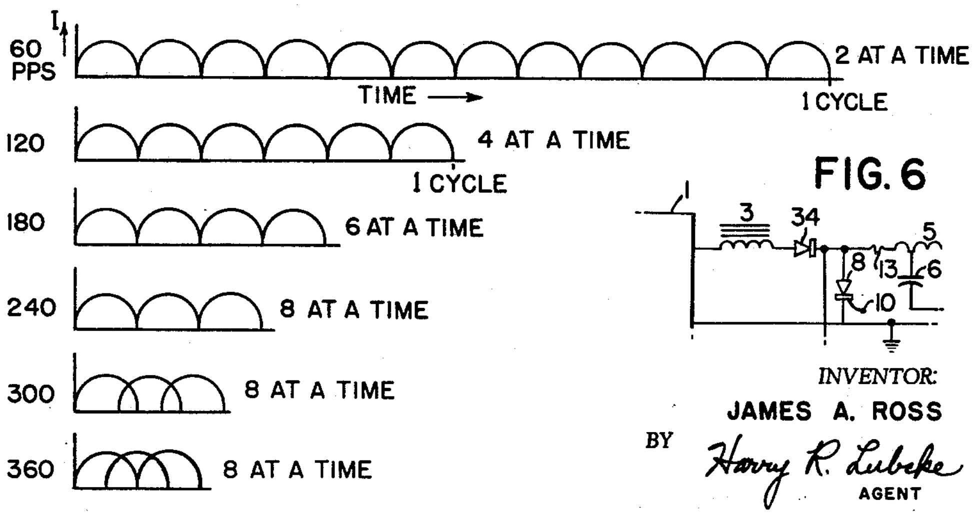

FIG. 1 is the schematic diagram of my multiple modulator,

FIG. 2 is a side elevation of the construction of a chargeable transmission line for the same, FIG. 3 is an end elevation of this transmission line, FIG. 4 is a sectional end view of my multiple-primary transformer, FIG. 5 shows a series of six charging waveforms according to my method of modulator operation, and FIG. 6 is a fragmentary schematic diagram of an alternate embodiment of the modulator of FIG. 1.

In a typical embodiment of my modulator 24 groups of 24 individual transmission line type modulators are employed. This is generally shown in FIG. 1. A three-phase A.C. to D.C. rectifier 1 supplies rectified electrical output to "N" individual modulators, where "N" is typically 24. A usual smoothing filter is not required, as will be later explained in connection with my method of operating modulators. The chargeable transmission lines 2, 2′, etc. are charged through inductor 3 and diode 4. The inductor may have an iron or an air core and an inductance of approximately one millihenry. I prefer to employ a solid state gated device for diode 4, of which a silicon controlled rectifier is an example.

The artificial transmission lines 2, 2′, etc. are preferably formed of very simple "inductors" 5 and capacitors 6 as shown in FIGS. 2 and 3 because there are so many of them. Actually, only capacitors and strap connectors are physically employed, as is shown. A row of nine capacitors of the extended foil tubular type are shown in FIG. 2. The extended foil construction is desirable in that this reduces the residual inductance in the capacitor itself. Each of the capacitors 6 is of 0.2 microfarad capacitance in a typical embodiment, and a row of 28 capacitors is normally employed rather than the illustrative nine shown in FIG. 2. With a 200 volt power supply 1 a 400 volt charge accumulates on the capacitors because of resonant charging, thus 600 volt working rated capacitors are desirable.

The connecting "inductor" straps 5 may be of copper or aluminum. These are located at the top and the bottom of the vertically standing capacitors 6 and are soldered to the top and bottom capacitor leads 7. FIG. 3 shows the end view of the assembly and it is seen that the strap "inductors" are rather wide so that the value of inductance will be small as is required.

Returning to the circuit of FIG. 1, it will be understood that only two of a group of 24 individual pulse modulators have been shown. These all obtain charging power from the one three-phase rectifier 1. Typically, there are 23 more such rectifiers, each with the full structure indicated in FIG. 1.

The solid state shorting switches 8, 8′, etc. each have an anode connected to the corresponding transmission lines 2, 2′, etc. and a cathode connected to ground 9. A control electrode 10, 10′, etc. is also provided for each switch of the nature of the same in the known silicon controlled rectifier. The shorting by the switches is accomplished by impressing a pulse of positive polarity upon connections 10, 10′, etc. by means to be later described. After lines 2, 2′, etc. have been charged through elements 3 and 4 they are discharged through primaries 11, 11′, etc., by the action of the shorting switches. The several lines are connected to transformer 12 through the recited primaries. Each transformer 12 has two secondaries 14 (of which only one is shown), each secondary being associated with 12 primaries such as 11, 11′, etc.

The two secondaries 14 are connected in parallel to primary 16 of additional transformer 15, as are the secondaries from the other 23 transformers 12 to complete the whole modulator of 576 chargeable transmission lines.

This cascade arrangement of transformers is used to achieve, typically, a 1,200 to 1 step-up transformation of voltage for operating klystron 17 (FIG. 1), or an equivalent load. The anode and the cathode of klystron 17 are connected to secondary 18 of transformer 15, as shown.

First transformer 12 in the cascade typically has a 100 to 1 step-up ratio and is constructed as shown in FIG. 4. A core 25 is preferably fabricated from a 50% nickel, 50% steel (Fe) material, of which Delta-Max, by Arnold Engineering Co., is an example. Around the core is a single turn primary winding 21. This is preferably of copper ribbon or strap and extends transversely of the section of the core the full distance of the winding space for the coil structure, as four inches. Connecting to this winding is a start connection S, close to the core, which is formed of a strip of foil-like copper, which extends from the coil turn at right angles and away from the same for a distance of one foot or so, as required for external connections. In the same way the finish connection F is provided. Although only one such primary has been shown for sake of clarity, there are actually six such primaries in a preferred embodiment of this transformer at this section. These six windings are each the equivalent of primary 11 (or 11′, etc.) of FIG. 1 for six solid state modulators 2, 5, 6, 8, 10, 13 in that figure.

Wound next upon these primaries is secondary winding 22, being the equivalent of secondary 14 in FIG. 1. The secondary winding starts at end S′ and is wound in the same direction as primary 21 to the extent of 100 turns. This winding has been shown dotted and only one turn has been shown for sake of clarity in FIG. 4. At the termination of this part of the winding, at 23, the direction of winding is reversed and is then continued for another 100 turns to the finish end F'; providing what may be termed a double secondary structure.

Wound upon this secondary is another primary 24, being wound in the same direction as primary 21. This has start S'' and finish F''. It is the same as the previously described primary, including the fact that six primaries are also here provided. This accommodates a total of twelve modulators of elements 2, 5, 6, 8, 10, 13 in this one composite coil structure.

The reversed secondary and the additional primaries wound upon the outside of the same give a stray capacitance configuration that is constant regardless of external bodies and that is relatively small, as is desired for pulse transformer work. In FIG. 1 the high potential connection of secondary 14 is the reversal of winding point 23 in FIG. 4. The opposite end of coil 14 in FIG. 1 is constituted of ends S' and F' together in FIG. 4.

I prefer to construct the transformer of FIG. 4 upon a rectangular core and to position two complete coil assemblies like the one shown on opposite sides of the core. Thus, a transformer with 24 primaries and two double secondaries is provided, which secondaries are paralleled to feed transformer 15 as has been previously mentioned.

Transformer 15 has a typical 12 to 1 step-up ratio from primary 16 to secondary 18. It partakes of the nature of a transformer employed from a single switch tube ignitron pulse modulator to klystron load, such as is shown in my U.S. Patent No. 3,088,074, issued April 30, 1963, and entitled, "Pulse Former Using Gas Tube With Substantially Grounded Suppressor and Negative Pulse for Rapid Deionization." The transformer ratios are multiplied in cascading transformers 12 and 15, thus the 1,200 to 1 step-up ratio previously mentioned is accomplished.

An additional important advantage of the multiplicity of individual modulator circuits which I employ is the relatively even flow of power from the power supply mains and the good transformer utilization factor which can be effected. This is accomplished by charging the many individual transmission lines 2, 2', etc. at staggered times although these are all discharged at one time to form the single output power pulse.

It will be understood that when the modulator as a whole is operated at its maximum repetition rate, say 360 pulses per second (p.p.s.), it is necessary to charge the lines and then to almost immediately discharge them. When a lower repetition rate is desired and is employed, as 60 p.p.s., the rate of charging is the same as before, since this is set by the inductance of charging reactor 3, but the discharge does not occur for some considerable time later; i.e., 360/60=6 time intervals later based upon the time interval for the 360 p.p.s. repetition rate.

According to my method of operating a modulator, three-phase rectifier 1 of FIG. 1 supplies electric power relatively uniformly with time. This is because of the staggered charging times of the 576 individual transmission lines. These lines are arranged in groups of 24 for convenience, which are all fed from one rectifier 1. The conventional filter for a rectifier accumulates a charge constantly for delivery at once upon the simultaneous charging of the whole line structure in conventional modulator practice.

FIG. 5 shows the charging routine for six pulse repetition rates which may be considered typical in this art according to my method. The horizontal time axis has an extent that is proportional to the period required for "one cycle" of each of the rates. This period includes one power output pulse and the dwell interval between that pulse and the next one. Each of the several ordinates gives the amplitude of the three-phase current drawn from power supply 1.

From the previous exposition it will be seen that if staggered charging were not employed, the charging of all lines would be completed at the end of the relatively short time interval shown for the 360 p.p.s. repetition rate at the bottom of FIG. 5. For 60 p.p.s. operation, with the long time interval shown at the top of the figure, no power would be taken from the mains for a long period of time; i.e., not until directly after the next pulse. Such uneven power drain is the equivalent of single-phase loading of a three-phase power circuit; an inefficient arrangement.

I arrange charge timing by suitably timing trigger pulses for controlled rectifier 4 for each of the 24 groups of 24 lines in my whole modulator. It will be understood that this diode 4 is triggered into conduction upon a positive pulse being impressed upon trigger terminal *t*, and not before, regardless of the potential present upon it from the rectifier 1. Appropriate staggered triggering is accomplished by charging two sets of 24 lines at a time for the 60 p.p.s. repetition rate, four sets at a time for the 120 p.p.s. rate, 6 sets at a time for the 180 p.p.s. rate, 8 sets at a time for the 240 p.p.s. rate, 8 sets at a time for the 300 p.p.s. rate, and 8 sets at a time for the 360 p.p.s. rate. For the 300 p.p.s. rate there is some overlap on the charge cycles and at 360 p.p.s. the charging cycles overlap at the 90° points. However, the current drain is, overall, substantially constant upon rectifiers 1 for each condition of repetition rates. Each half-cycle sine wave shown in FIG. 5 represents the current taken from the mains to charge one group of transmission lines 2, 2', etc. one time from one rectifier 1.

The selection of the repetition rate in a pulse modulator apparatus is usually accomplished by employing a switch having several positions, one for each rep. rate. Additional contacts on this same switch assembly may be used to time the generation of triggering pulses for the several series diodes 4 according to the method of FIG. 5. This is accomplished in first pulse generator 19. Appropriately timed pulses of short duration are supplied at terminal *t*, having a positive polarity with respect to ground. Generator 19 may be synchronized from the 60 cycle power mains.

The circuit for generator 19 may be the solid state voltage sensing circuit of FIG. 13.13, page 197, of the General Electric "Transistor Manual," Sixth Edition.

A sawtooth waveform having the same repetition rate as the pulse repetition rate is provided for each position of the repetition rate selector switch. A plurality of the above-referenced voltage sensing circuits is provided; one for each group of lines to be charged (a maximum of twelve as noted from the 60 p.p.s. rate at the top of FIG. 5). Each of these circuits is also provided with a unique bias voltage. The sawtooth waveform is impressed upon the voltage-level sensing connection to all of the sensing circuits. Those circuits which are provided with a small opposing bias will form a pulse early in the sawtooth cycle and vice versa. In this way it is seen that the staggered timing required according to my method is obtained.

It will be further understood that if 24 groups of lines were separately charged instead of two at a time as postulated for the 60 cycle operation in FIG. 5 and the timing was made 180° out of phase for successive charges, then half-cycle sine waves would be interspersed between those shown and the constancy of current drain is more than twice improved. At the present time this refinement is not necessary for a practical embodiment, but it may be employed for still higher powers, or for other reasons. This same refinement of stagger timing may be applied to other of the repetition rates shown in FIG. 5.

For charging diode 4 in a typical embodiment a G.E. C35 controlled rectifier may be used, or an equivalent controlled rectifier rated at 20 amperes at 200 volts or more may be used.

It will be understood that a minimum of twelve charging circuits are required to take advantage of the staggered charging method shown in FIG. 5. For convenience in component sizes and ratings I have disclosed the use of 24 in this specification.

A second pulse generator 20 produces the simultaneous-discharge pulse.

Also, as shown in FIG. 1, I prefer to employ a fuse 13, formed of fusible wire or the equivalent, at the start of each of the 576 transmissin lines 2. This is so that if one or more of the individual capacitors 6 in any transmission line produce a short across it upon failure thereof, the fuse will blow. This removes the one transmission line formerly in service, but is effective in allowing the other 23 individual lines connected to the same rectifier 1 to function normally. It will be seen that because of the great number of "building blocks" which I employ to provide the load current and power, i.e., 576 individual chargeable-shorting entities, a considerable number of these can become defective and still the operation of the modulator as a whole is very little affected.

Ordinary servicing procedures will cure such defects with safety because of the relatively low voltages existing in most of the apparatus. My transmission lines according to FIG. 2 can be arranged for plug-in packaging in the apparatus and thus can be replaced while the modulator is in service. It will be recalled that the transmission line voltage in the equivalent gaseous shorting switch apparatus is 40,000 volts; not 400 volts.

I prefer to incorporate a simple gaseous visual indicator in each transmission line package 2, 2', etc., such as small neon lamp 30 with appropriate current-limiting resistor 31 in series across the line to ground. These elements are shown dotted in FIG. 1 to make it apparent that they are not part of the basic apparatus. When the line is operating properly the neon lamp will glow and vice versa.

Similar indicators are preferably provided for each of the 24 line groups, to indicate when one such charging group might go defective. Even if this should happen, there would be 23 more charging sections in operation and thus only a four percent loss of power output. This loss can be compensated for by increasing the voltage from the remaining power supplies by two percent.

Such dependability in depth is highly desired in certain uses to which pulse modulators are put, as for particle accelerator experiments in physics. It is seen that my multiplicity concept greatly reduces the statistical probability for noticeable failure. Much to the contrary, a prior art modulator, having a single or at most two gaseous shorting switch elements in parallel is bound to go down in default upon flash phenomena occurring with high voltage gaseous conduction. Such high voltage gaseous switches have a statistical rate of arc-over type failure. These are relatively frequent failures and such do not occur in low voltage solid state devices.

It will be understood that a single three-phase rectifier 1 may be employed for all of the 24 groups of 24 (each) transmission line pulse modulators. This is preferably accomplished by providing 24 inductors 3 and 24 diodes 4, each pair connected in series like the showing in FIG. 1 and the left-hand end of each inductor connected to the output terminal of one large three-phase rectifier 1.

It will also be understood that the dependability of operation obtained with my apparatus may still be obtained without the staggered charging feature by employing an ordinary diode for element 4 of FIG. 1, rather than a triggerable diode having a control electrode *t*. This is shown in FIG. 6. The diode is 34. In such an alterable embodiment the charging time is controlled by the inductance of inductor 3 and all of the pulse modulators 2, 2', etc. are charged together shortly after the discharge pulse initiated by generator 20 occurs.

In this modification pulse generator 19 is not required.

In any of my embodiments it will be seen that I have radically departed from the usual method and the usual apparatus for obtaining high voltage high power modulating pulses of electrical energy. I have employed a multiplicity of low voltage and low power individual pulse modulators and by combining all of the outputs of the same by a special output transformer assembly I obtain the desired single high voltage high power pulse. Such pulses are, of course, repeated as desired according to the usual repetition rates by the continued operation of the apparatus.

Although specific examples of voltages, currents, waveforms and values for the circuit elements have been given in this specification to illustrate the invention, it is to be understood that these are by way of example only and that reasonably wide departures can be taken therefrom without departing from the inventive concept. Modifications of the circuit elements, details of circuit connections and alteration of the coactive relation between elements may also be taken under my invention.

Having thus fully described my invention and the manner in which it is to be practiced, I claim:

1. The method of forming repetitive electrical pulses which includes;
  (*a*) grouping plural chargeable means in plural paralled groups, the number of said plural groups being proportional to the time interval between successive said repetitive pulses,
  (*b*) charging each said group at a mutually exclusive time in the interval between successive said repetitive pulses, and
  (*c*) discharging all of said chargeable means simultaneously to form one of said repetitive pulses.

2. An electrical modulator comprising;
  (*a*) inductive charging means,
  (*b*) at least one transformer having plural primaries and a secondary,
  (*c*) a plurality of pulse modulators, having;
    first triggerable means to initiate charging of the pulse modulator,
    individual chargeable means connected to said first triggerable means,
    second triggerable means connected to individually short said chargeable means through one of said plural primaries,
  (*d*) first pulse means to trigger said first triggerable means of said plurality of pulse modulators at staggered times, and
  (*e*) second pulse means to trigger all of said second triggerable means at the same time to form an output pulse from said modulator.

3. The modulator of claim 2 in which;
  (*a*) said plural primaries of said transformer are wound inside and also outside of a secondary of said transformer, and
  (*b*) said secondary is wound back upon itself with the number of turns in the reverse winding equal to the number of turns in the forward winding.

4. The modulator of claim 2 in which;
  said first triggerable means is a semiconductor device having a trigger control electrode.

5. The modulator of claim 2 in which;
  said second triggerable means is a solid state device having a trigger control electrode.

6. The modulator of claim 4 in which;
  said semiconductor device is a silicon controlled rectifier.

7. The modulator of claim 5 in which;
  said solid state device is a silicon controlled rectifier.

8. The modulator of claim 2 in which said first pulse means includes;
  (*a*) a plurality of non-inductive capacitors aligned bias voltage, and
  (*b*) a source of sawtooth voltage, to provide triggering pulses to specific said first triggerable means at staggered times according to the changing voltage of the sawtooth wave with time.

9. The modulator of claim 2 in which each said chargeable means includes
(*a*) a plurality of non-inductive capacitors aligned with each terminal thereof connected to one of two parallel strip conductors.

10. The modulator of claim 2 in which
(*a*) a gaseous illuminating means is connected across each said chargeable means to give an indication when said chargeable means has received an electrical charge.

11. An electrical modulator comprising;
(*a*) charging means having plural inductors and plural first triggerable means to initiate charging of pulse modulators,
(*b*) plural first type transformers each having plural primaries and a secondary,
(*c*) a multiple plurality of pulse modulators, each having;
reactive chargeable means connected to said first triggerable means,
second triggerable means connected to electrically short said chargeable means through one of said plural primaries;
(*d*) one multiple of said plurality of pulse modulators connected to one of said plural first triggerable means and to the primaries of one of said plural first type transformers,
(*e*) first pulse means to trigger said first triggerable means of the plurality of said pulse modulators at staggered times, whereby electrical charge relatively uniformly flows from said charging means,
(*f*) second pulse means to trigger all of said second triggerable means subsequently, at the same time, and
(*g*) a second type transformer connected to each secondary of said plural first type transformers to provide one electrical output.

12. The modulator of claim 11 in which;
(*a*) both first and second type transformers have voltage step-up ratios to provide an electrical pulse output voltage large with respect to the voltage of said charging means.

13. The modulator of claim 11 in which
(*a*) a fuse is connected to each reactive chargeable means, to disconnect the same from a said inductor upon said chargeable means becoming shorted.

14. The modulator of claim 11 in which
(*a*) said charging means is exclusively a plural phase electrical rectifier with an absence of filtering elements.

15. An electrical modulator system comprising;
(*a*) at least one inductive charging means having first triggerable semiconductor means to initiate charging of pulse modulators,
(*b*) at least one first type transformer having plural strap-wound primaries and a secondary wound between said plural primaries,
(*c*) a large plurality of pulse modulators, each having;
an electrically fused inductive-capacitative chargeable means connected to said first triggerable means,
second triggerable semiconductor means connected to electrically short said chargeable means through one of said plural primaries,
(*d*) first pulse means connected to trigger said first semiconductor means of groups of the said plurality of pulse modulators at different times during the interval between the formation of successive pulses, whereby, electrical charge relatively uniformly flows from said charging means,
(*e*) second pulse means to simultaneously trigger all of said second semiconductor means to provide an output pulse from said modulator system, and
(*f*) a second type transformer connected to said first type transformers to provide an electrical output of voltage large with respect to the voltage of said inductive charging means.

16. An electrical modulator comprising;
(*a*) a multiplicity of pulse modulators,
(*b*) charging means having at least one inductor and one diode means to charge said pulse modulators,
(*c*) at least one transformer having a multiplicity of primaries,
(*d*) means to connect one of said primaries to one of said pulse modulators for each of said multiplicity of these elements,
(*e*) triggerable semiconductor means connected to each said pulse modulator and said transformer primary to discharge the former through the latter to form a combined output pulse from said electrical modulator.

17. The modulator of claim 16 in which;
(*a*) said diode means is a two electrode semiconductor diode.

References Cited by the Examiner

UNITED STATES PATENTS

| | | | |
|---|---|---|---|
| 2,349,437 | 5/44 | Keeler | 320—1 X |
| 3,047,807 | 7/62 | Langan | 320—1 |

ARTHUR GAUSS, *Primary Examiner.*